US006495234B2

(12) United States Patent
Usami

(10) Patent No.: US 6,495,234 B2
(45) Date of Patent: *Dec. 17, 2002

(54) OPTICAL INFORMATION RECORDING MEDIUM AND METHOD OF MANUFACTURING SAME

(75) Inventor: Yoshihisa Usami, Odawara (JP)

(73) Assignee: Fuji Photo Film co., Ltd., Kanagawa-Ken (JP)

( * ) Notice: Subject to any disclaimer, the term of this patent is extended or adjusted under 35 U.S.C. 154(b) by 46 days.

This patent is subject to a terminal disclaimer.

(21) Appl. No.: 09/735,502

(22) Filed: Dec. 14, 2000

(65) Prior Publication Data

US 2001/0005536 A1 Jun. 28, 2001

(30) Foreign Application Priority Data

Dec. 14, 1999 (JP) ............................. 11-354350

(51) Int. Cl.$^7$ ................................. B32B 3/02
(52) U.S. Cl. ................. 428/64.1; 428/64.4; 430/270.11
(58) Field of Search ............... 428/64.1, 64.4, 428/913; 430/270.11, 495.1, 945; 427/164, 168

(56) References Cited

U.S. PATENT DOCUMENTS

| 5,715,051 A | 2/1998 | Luster |
| 6,309,728 B1 * | 10/2001 | Usami ....................... 428/64.1 |
| 6,340,501 B1 * | 1/2002 | Kamiyama ............... 427/255.6 |

FOREIGN PATENT DOCUMENTS

| JP | 2-300288 | 12/1990 | ........... C09K/15/20 |
| JP | 3-224793 | 10/1991 | ............ B41M/5/26 |
| JP | 03-280232 A | 12/1991 | |
| JP | 04-102983 A | 4/1992 | |
| JP | 4-146189 | 5/1992 | ............ B41M/5/26 |

OTHER PUBLICATIONS

Patent Abstracts of Japan, vol. 016, No. 341 (P–1391), Jul. 23, 1992 & JP 04 102983 A (NEC Corp), Apr. 3, 1992 *abstract*.
Patent Abstracts of Japan, vol. 016, No. 105 (P–1325), Mar. 16, 1992 (JP 03 280232 A (Sony Corp), Dec. 11, 1991 *abstract*.
Patent Abstract of Japan 02300288 A, Dec. 12, 1990.
Patent Abstract of Japan 03224793 A, Oct. 3, 1991.
Patent Abstract of Japan 04146189 A, May 20, 1992.

* cited by examiner

Primary Examiner—Elizabeth Mulvaney
(74) Attorney, Agent, or Firm—Sughrue Mion, PLLC

(57) ABSTRACT

A film thickness inspecting mechanism includes a light source disposed below a substrate, a CCD unit for detecting a light beam (transmitted light beam) emitted from the light source and transmitted through the substrate and converting the detected light beam into an electric signal (detected signal) commensurate with the detected intensity of the light beam, a substrate feeder having a plurality of light shield plates for blocking a light beam emitted from the light source at given intervals, and a substrate holder for holding the substrate.

8 Claims, 19 Drawing Sheets

OPTICAL INFORMATION RECORDING MEDIUM AND METHOD OF MANUFACTURING SAME

BACKGROUND OF THE INVENTION

1. Field of the Invention

The present invention relates to an optical information recording medium of the heat mode type having a recording layer disposed on a substrate and capable of recording information by exposure to a laser beam and a method of manufacturing such an optical information recording medium, and more particularly to an optical information recording medium whose recording layer can be inspected by an inspecting means and a method of manufacturing such an optical information recording medium.

2. Description of the Related Art

Optical information recording mediums (optical disks) capable of recording information once with a laser beam include a write-once CD (so-called CD-R) and a DVD-R. These optical information recording mediums are advantageous in that they allow a smaller quantity of CDs to be supplied quickly to the market at a reasonable price than conventional CDs (compact disks), and there are growing demands for such optical information recording mediums in view of the recent widespread use of personal computers.

Typically, a CD-R-type information recording medium comprises a disk-shaped transparent substrate having a thickness of about 1.2 mm, a recording layer of an organic dye deposited on the substrate, a light reflecting layer of metal such as gold or silver disposed on the recording layer, and a protective layer of resin disposed on the light reflecting layer.

A DVD-R-type information recording medium comprises two disk-shaped transparent substrates each having a thickness of about 0.6 which are bonded to each other with their information recording surfaces facing each other. The DVD-R-type information recording medium can record a greater amount of information.

Information can be written or recorded on these optical information recording mediums by applying a laser beam in a near-infrared range, e.g., a laser beam having a wavelength of about 780 nm for a CD-R or a laser beam having a wavelength of about 635 nm for a DVD-R, to the optical information recording mediums. When the laser beam is applied to an area of the dye recording layer, the irradiated area absorbs the applied laser beam and causes a local temperature rise, which produces a physical or chemical change, e.g., generates a pit, to change optical characteristics of the area of the dye recording layer for thereby recording the information.

Recorded information can be read or reproduced by applying a laser beam having the same wavelength as the wavelength of the recording laser beam. The recorded information is reproduced based on the detected difference between the reflectance of the area where the optical characteristics of the dye recording layer have been changed, i.e., a recorded area represented by the pit, and the area where the optical characteristics of the dye recording layer have not been changed, i.e., an unrecorded area.

If optical disks have a dye recording layer which suffers thickness irregularities, then those optical disks tend to cause a reading error and/or a recording error.

SUMMARY OF THE INVENTION

It is therefore an object of the present invention to provide an optical information recording medium of high quality which is produced through highly accurate inspection of the thickness of a recording layer formed on a substrate in the process of fabricating the optical information recording medium, and a method of manufacturing such an optical information recording medium.

According to the present invention, there is provided an optical information recording medium of the heat-mode type, comprising a substrate, and a recording layer disposed on the substrate for recording information upon exposure to a laser beam, the optical information recording medium being fabricated by inspecting a film thickness of the recording layer based on a detected signal from transmitted light detecting means for detecting a light beam having passed through the substrate, and inspecting a full amount of a light beam emitted from light applying means for applying the light beam to the substrate with the recording layer disposed thereon and an amount of light while the light beam emitted from the light applying means is being blocked by light shielding means for blocking the light beam emitted from the light applying means.

According to the present invention, there is also provided a method of manufacturing an optical information recording medium of the heat-mode type having a substrate, and a recording layer disposed on the substrate for recording information upon exposure to a laser beam, using film thickness inspecting means for inspecting a film thickness of the recording layer, the film thickness inspecting means having light applying means for applying the light beam to the substrate with the recording layer disposed thereon, transmitted light detecting means for detecting a light beam having passed through the substrate, and light shielding means for blocking the light beam emitted from the light applying means, the method comprising the steps of inspecting a film thickness of the recording layer based on a detected signal from the transmitted light detecting means, and inspecting a full amount of the light beam emitted from the light applying means and an amount of light while the light beam emitted from the light applying means is being blocked by the light shielding means.

With the above arrangement, it is possible to accurately inspect the film thickness of the recording layer on the substrate without being affected by ambient light such as light from fluorescent lamps, and reject any optical information recording mediums or optical disks with insufficient film thicknesses from a fabrication stage. Therefore, fabricated optical disks are prevented from suffering reading and recording errors.

The extinction coefficient of the light beam emitted from the light applying means at the complex index of refraction should preferably range from 0.2 to 1.2, more preferably range from 0.5 to 1.2, and most preferably range from 0.9 to 1.2.

Furthermore, there is also provided in accordance with the present invention a method of manufacturing an optical information recording medium of the heat-mode type having a substrate, and a recording layer disposed on the substrate for recording information upon exposure to a laser beam, using film thickness inspecting means for inspecting a film thickness of the recording layer, the film thickness inspecting means having light applying means for applying the light beam to the substrate with the recording layer disposed thereon, and transmitted light detecting means for detecting a light beam having passed through the substrate, the method comprising the steps of inspecting a film thickness of the recording layer based on a detected signal from the transmitted light detecting means, and setting an extinction coefficient of the light beam emitted from the light applying means to a value ranging from 0.2 to 1.2 at a complex index of refraction.

Thus, the relationship between optical densities of transmitted light determined from the transmittance of the light beam having passed through the recording layer and film thicknesses of the recording layer can be approximately represented by a linear function irrespectively of the type of a dye employed in the recording layer, thus allowing the film thickness to be measured easily and highly accurately.

The light beam emitted from the light applying means may comprise a flickering light beam. Preferably, the light applying means and the transmitted light detecting means are fabricated as a monolithic structure on a substrate. Since the light applying means and the transmitted light detecting means are subject to the same temperature, the film thickness of dye recording layer can be inspected with high accuracy without causing errors due to the ambient temperature. The substrate is preferably made of a semiconductor.

The film thickness inspecting means should preferably include an optical fiber for guiding the light beam emitted from the light applying means to the substrate and an optical fiber for guiding the light beam having passed through the substrate to the transmitted light detecting means.

The above and other objects, features, and advantages of the present invention will become more apparent from the following description when taken in conjunction with the accompanying drawings in which preferred embodiments of the present invention are shown by way of illustrative example.

DESCRIPTION OF THE PREFERRED EMBODIMENTS

Figure 1:
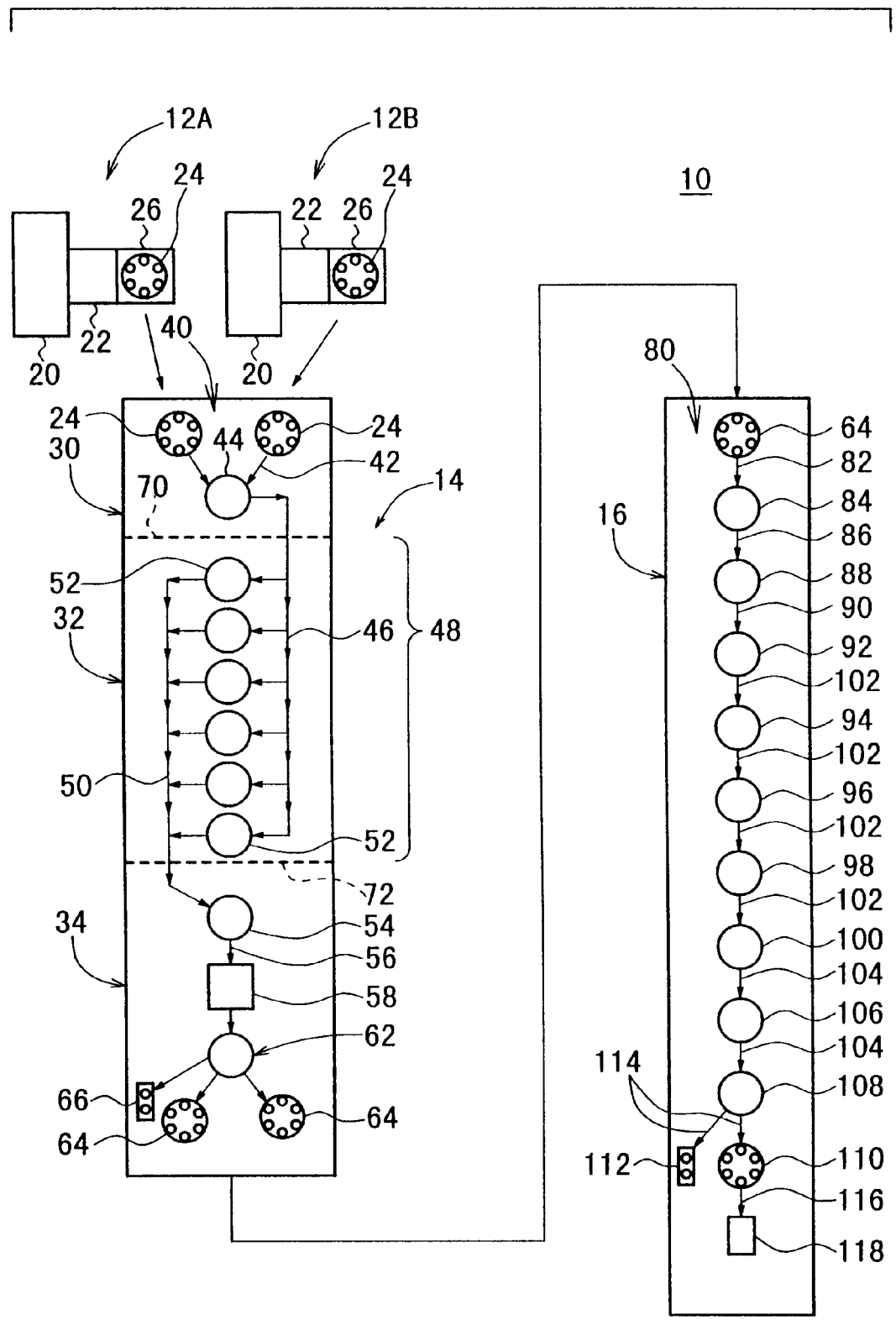
FIG. 1 is a schematic plan view of a production system for carrying out a method of manufacturing an information recording medium according to a first embodiment of the present invention.

As shown in FIG. 1, a production system 10 for carrying out a method of manufacturing an information recording medium according to a first embodiment of the present invention generally comprises two injection molding facilities (first and second molding facilities) 12A, 12B for producing two substrates by injection molding, compression molding or injection compression molding, a coating facility 14 for coating and drying a dye solution on one principal surface of a substrate to produce dye recording layers on the substrate, and a post-treatment facility 16 for forming a light reflecting layer on the dye recording layer of a substrate by sputtering, for example, coating an UV-curable solution on the dye recording layer on the substrate, and applying ultraviolet rays to the coated UV-curable solution to cure the coated UV-curable solution thereby to form a protective layer on the light reflecting layer on the substrate.

Each of the first and second molding facilities 12A, 12B comprises a molding machine 20 for producing a substrate 202 (see FIG. 7A) which has tracking grooves or grooves (recesses and protrusions) 200 formed on a principal surface thereof as representing information such as address signals, by molding a synthetic resin material such as polycarbonate by injection molding, compression molding, or injection compression molding, a cooling unit 22 for cooling the substrate 202 discharged from the molding machine 20, and a stacking unit (stack pole rotary table) 26 having a plurality of stack poles 24 for stacking and storing cooled substrates 202.

The coating facility 14 comprises first, second, and third processing stations 30, 32, 34. The first processing station 30 comprises a stack pole storage unit 40 for storing stack poles 24 that are delivered from the first and second molding facilities 12A, 12B, a first feed mechanism 42 for taking one at a time of the substrates 202 stacked on the stack poles 24 and feeding the substrate 202 to a next process, and an electrostatic blowing mechanism 44 for removing electrostatic charges from each substrate 202 fed by the first feed mechanism 42.

The second processing station 32 comprises a second feed mechanism 46 for successively feeding substrates 202 from which electrostatic charges have been removed by the electrostatic blowing mechanism 44 to a next process, a dye coating mechanism 48 for coating a dye solution to a plurality of substrates 202 fed by the second feed mechanism 46, and a third feed mechanism 50 for feeding one at a time of substrates 202 which have been coated with the dye solution. The dye coating mechanism 48 has an array of six spin coating devices 52.

The third processing station 34 has a reverse cleaning mechanism 54 for cleaning the reverse side of a substrate 202 fed by the third feed mechanism 50, a fourth feed mechanism 56 for feeding a substrate 202 whose reverse side has been cleaned by the reverse cleaning mechanism 54, a number assigning mechanism 58 for assigning a lot number, etc. to a substrate 202 fed by the fourth feed mechanism 56 by ink jet printing, and a film thickness inspecting mechanism 62 for inspecting the thickness of a dye recording layer 204 on a substrate 202 to which a lot number, etc. has been assigned.

The film thickness inspecting mechanism 62 can sort the substrate 202 delivered from the number assigning mechanism 58 selectively to a stack pole 64 for normal substrates and a stack pole 66 for defective substrates depending on the inspected result of the dye recording layer 204 of the substrate 202. Details of the film thickness inspecting mechanism 62 will be described later on.

A first partition plate 70 is disposed between the first processing station 30 and the second processing station 32, and a second partition plate 72 is disposed between the second processing station 32 and the third processing station 34. The first partition plate 70 has an opening (not shown) defined in a lower portion thereof which is large enough not to close a feed path for substrates 202 that are fed by the second feed mechanism 46, and the second partition plate 72 has an opening (not shown) defined in a lower portion thereof which is large enough not to close a feed path for substrates 202 that are fed by the third feed mechanism 50.

The post-treatment facility 16 comprises a stack pole storage unit 80 for storing stack poles 64 for normal substrates 202 that are delivered from the coating facility 14, a fifth feed mechanism 82 for taking one at a time of the substrates 202 stacked on the stack poles 64 stored in the stack pole storage unit 80 and feeding the substrate 202 to a next process, a first electrostatic blowing mechanism 84 for removing electrostatic charges from each substrate 202 fed by the fifth feed mechanism 82, a sixth feed mechanism 86 for successively feeding substrates 202 from which electrostatic charges have been removed by the first electrostatic blowing mechanism 84 to a next process, a sputtering mechanism 88 for forming a light reflecting layer on a principal surface of a substrate 202 fed by the sixth feed mechanism 86 by sputtering, a seventh feed mechanism 90 for successively feeding substrates 202 on which light reflecting layers have been formed, and an edge cleaning mechanism 92 for cleaning an peripheral edge of the substrate 202 fed by the seventh feed mechanism 90.

The post-treatment facility 16 also has a second electrostatic blowing mechanism 94 for removing electrostatic charges from each substrate 202 whose edge has been cleaned by the edge cleaning mechanism 92, an UV-curable solution coating mechanism 96 for coating an UV-curable solution on the principal surface of the substrate 202 from which electrostatic charges have been removed by the second electrostatic blowing mechanism 94, a spinning mechanism 98 for spinning the substrate 202 which has been coated with the UV-curable solution at a high speed to uniformize the coated thickness of the UV-curable solution, an UV applying mechanism 100 for applying ultraviolet rays to the principal surface of the substrate 202 which has been coated with the UV-curable solution and spun to cure the coated UV-curable solution thereby to form a protective layer on the principal surface of the substrate 202, an eighth feed mechanism 102 for feeding substrates 202 to the second electrostatic blowing mechanism 94, the UV-curable solution coating mechanism 96, the spinning mechanism 98, and the UV applying mechanism 100, a ninth feed mechanism 104 for feeding a substrate 202 to which ultraviolet rays have been applied to a next process, a defect inspecting mechanism 106 for inspecting, for defects, the coated surface and the protective layer surface of the substrate 202 delivered by the ninth feed mechanism 104, a characteristic inspecting mechanism 108 for inspecting signal characteristics due to grooves 200 formed in the substrate 202, and a sorting mechanism 114 for sorting the substrate 202 selectively to a stack pole 110 for normal substrates and a stack pole 112 for defective substrates depending on the inspected results from the defect inspecting mechanism 106 and the characteristic inspecting mechanism 108.

Figure 9A:
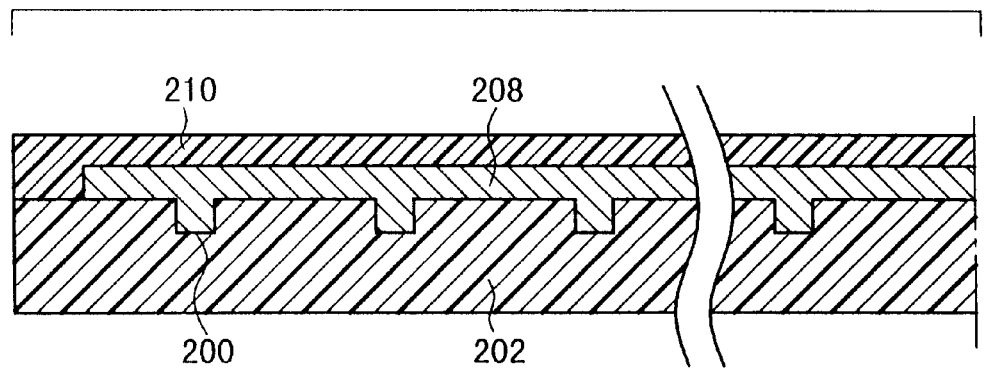
FIG. 9A is a fragmentary cross-sectional view of a substrate with a light reflecting layer and a protective layer disposed thereon.

The post-treatment facility 16 also includes a tenth feed mechanism 116 for feeding one at a time of the substrates 202 stacked on the stack pole 110 to a next process, and a bonding mechanism 118 for bonding a substrate 202 delivered by the tenth feed mechanism 116 and a stocked substrate 202 (see FIG. 9A) on which a light reflecting layer 208 and a protective layer 210 have been formed to each other such that their information recording surfaces face each other.

Structural details of each of the spin coating devices 52 will be described below with reference to FIGS. 2 through 6.

Figure 2:
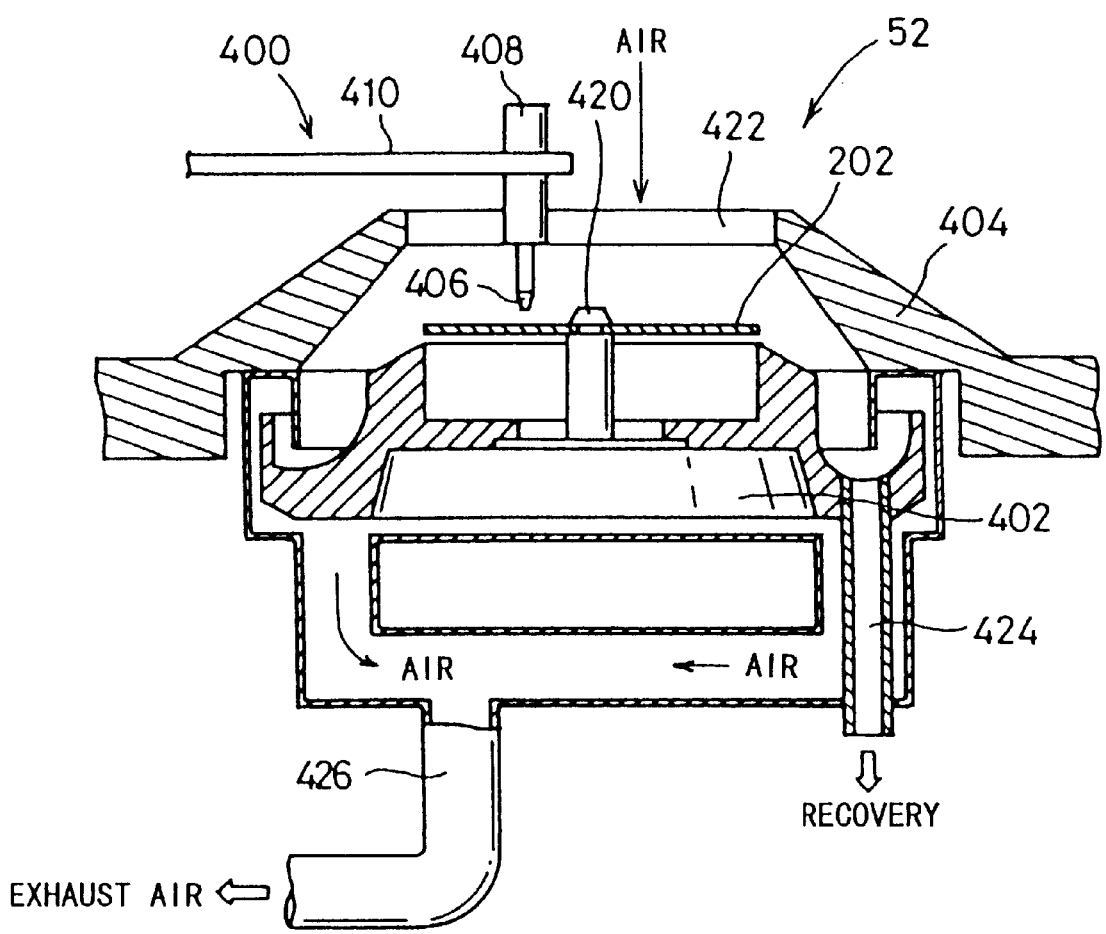
FIG. 2 is a fragmentary cross-sectional view of a spin coating device installed in a coating facility of the production system.
Figure 3:
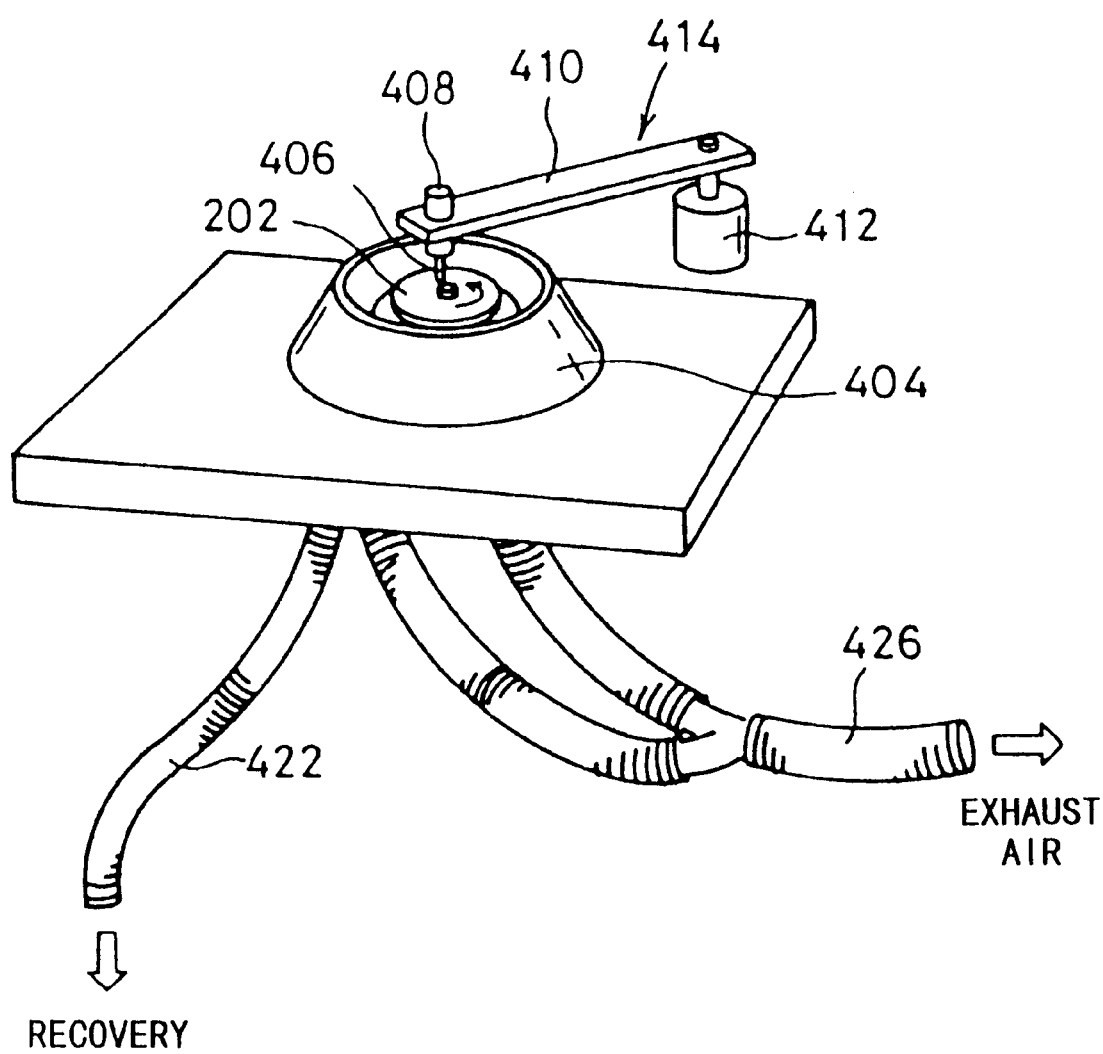
FIG. 3 is a perspective view of the spin coating device.

As shown in FIGS. 2 and 3, the spin coating device 52 has a coating solution applicator 400, a spinner head 402, and a scattering prevention wall 404. The coating solution applicator 400 has a pressurizing tank (not shown) filled with a coating solution, a pipe (not shown) extending from the pressurizing tank to a nozzle 406, and a discharged solution regulating valve 408 for regulating the amount of the coating solution discharged from the nozzle 406. The adjusted amount of the coating solution discharged from the nozzle 406 is dropped onto the surface of the substrate 202. The coating solution applicator 400 can be angularly moved from a standby position to a position over the substrate 202 by a handling mechanism 414. The handling mechanism 414 has a support plate 410 which supports the nozzle 406 with its orifice oriented downwardly, and a motor 412 for turning the support plate 410 horizontally.

The spinner head 402 is disposed below the coating solution applicator 400. The spinner head 402 has a fixture 420 by which the substrate 202 is detachably held in a horizontal plane. The spinner head 402 has its own vertical shaft rotatable about its own axis by a motor (not shown).

When the substrate 202 held horizontally by the fixture 420 is rotated by the motor, the coating solution is dropped from the nozzle 406 onto the surface of the substrate 202 and flows radially outwardly on the surface of the substrate 202 under centrifugal forces. An excessive amount of the coating solution that flows radially outwardly beyond the outer circumferential edge of the substrate 202 is thrown off the substrate 202 under centrifugal forces. The coating solution that remains on the surface of the substrate 202 is dried into a coated film as the dye recording layer 204.

The scattering prevention wall 404 is provided to prevent the excessive amount of the coating solution that is thrown off the substrate 202 from being scattered around the spin coating device 52. The scattering prevention wall 404 is of an annular shape extending around the spinner head 402 with an opening 422 defined over the spinner head 402. The excessive amount of the coating solution that is thrown off the substrate 202 is collected by the scattering prevention wall 404 and recovered through a drain pipe 424.

In the second processing station 32 (see FIG. 1), each of the spin coating devices 52 performs a localized discharging of air therethrough. Specifically, air is introduced from the opening 422 in the scattering prevention wall 404 into the spin coating device 52, flows onto and along the surface of the substrate 202 on the fixture 420, and is discharged through a discharge pipe 426 extending downwardly from the spinner head 402.

Figure 4:
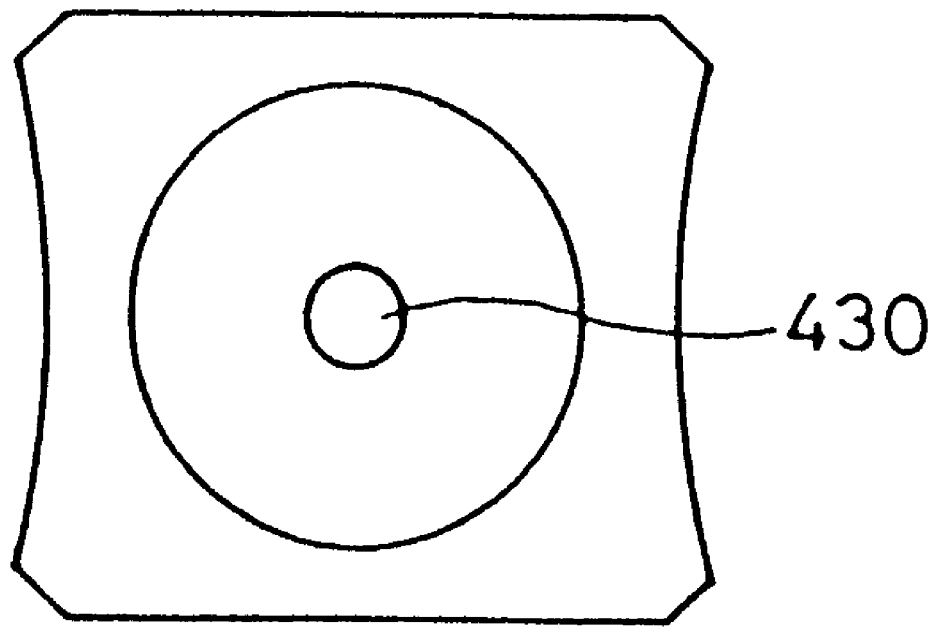
FIG. 4 is a plan view of a nozzle of the spin coating device.
Figure 5:
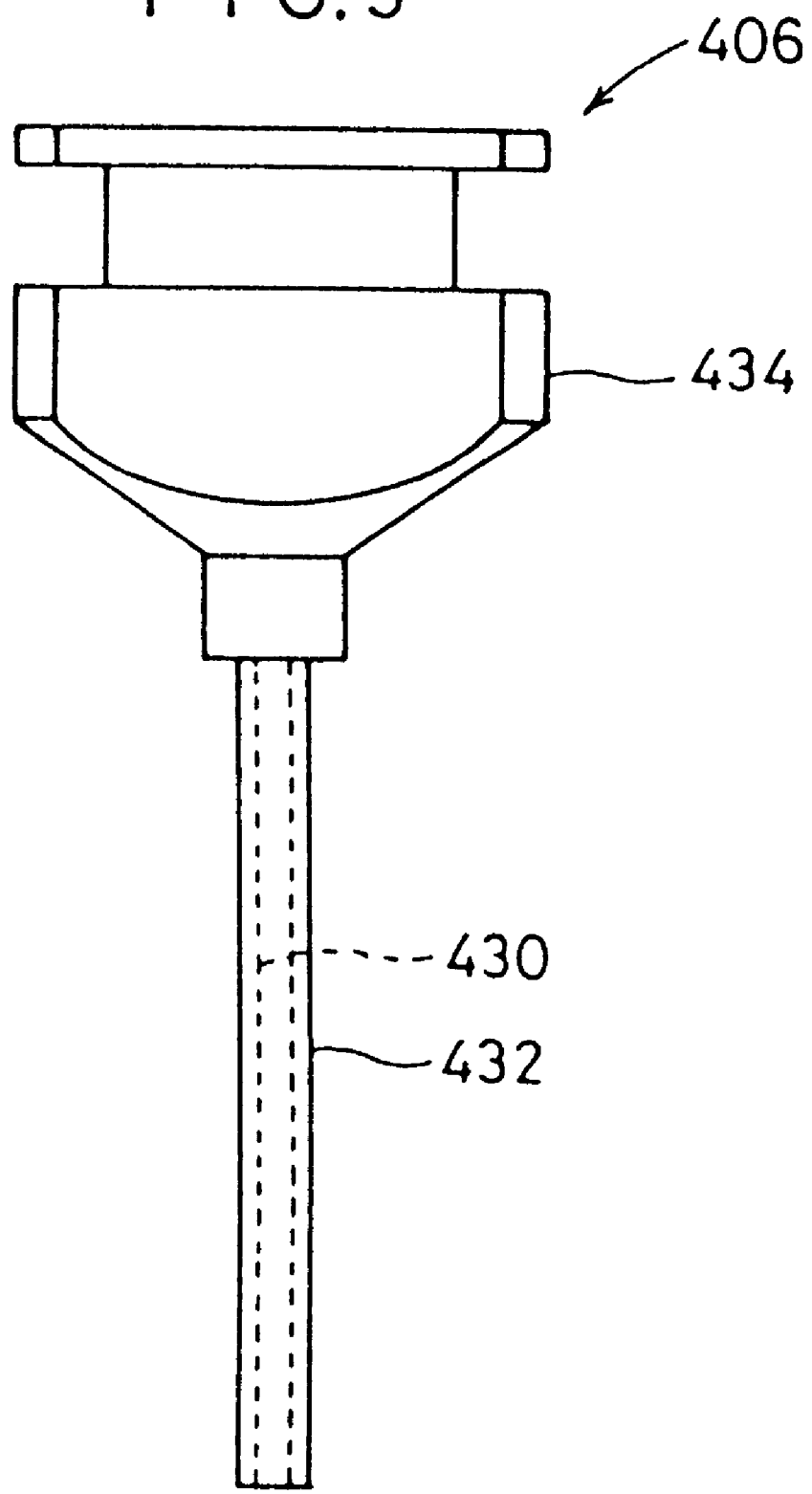
FIG. 5 is a side elevational view of the nozzle.

As shown in FIGS. 4 and 5, the nozzle 406 of the coating solution applicator 400 includes a slender cylindrical main nozzle body 432 having a through-hole 430 formed therethrough in the axial direction, and an attachment section 434 for fixing the main nozzle body 432 to the support plate 410 (see FIG. 3). The main nozzle body 432 has the following surface. That is, the forward end surface 440 and the outer or inner wall surface or both of the outer and inner wall surfaces 442, 444 ranging over a distance of not less than 1 mm from the forward end surface 440 are composed of a fluorine compound. Those usable as the fluorine compound include, for example, polytetrafluoroethylene and polytetrafluoroethylene-containing substances.

Figure 6:
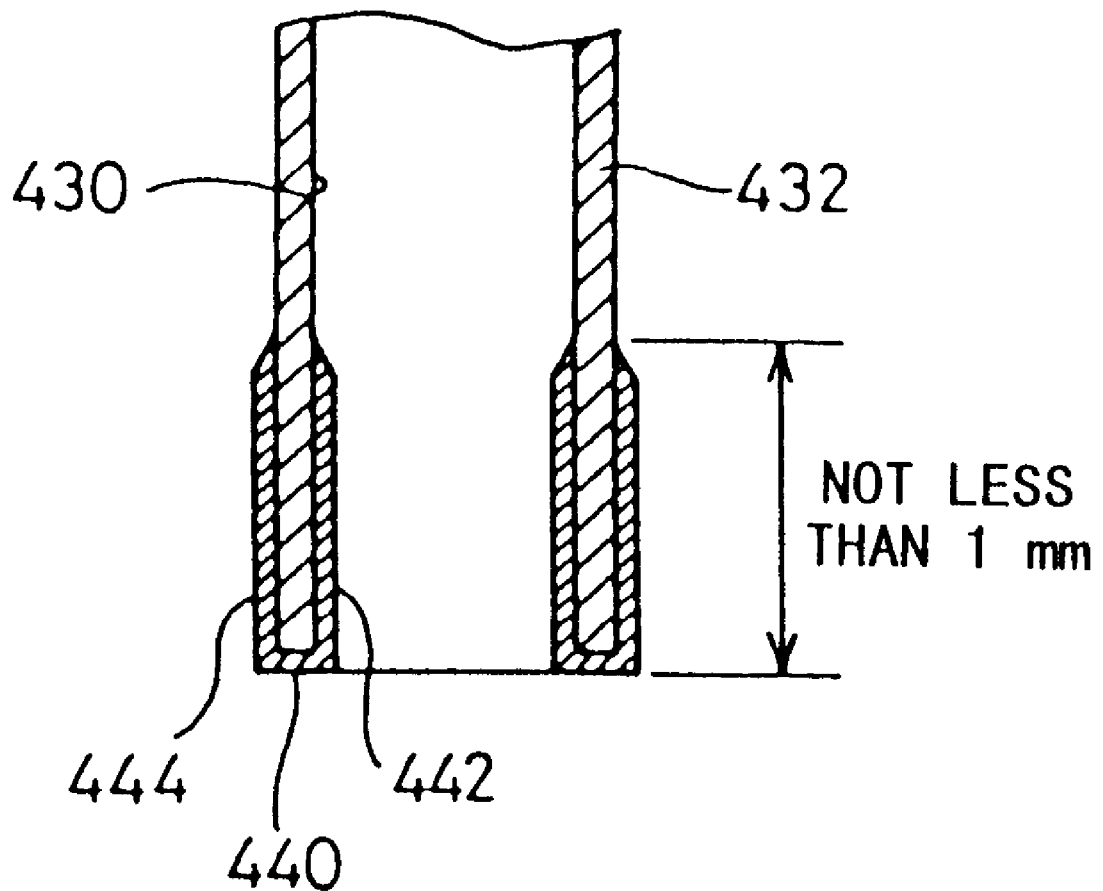
FIG. 6 is an enlarged fragmentary cross-sectional view of another nozzle.

Preferred examples of the nozzle 406 to be used in this embodiment include, for example, the nozzle 406 in which the portion, which includes the forward end surface of the main nozzle body 432 and which ranges over a distance of not less than 1 mm from the forward end surface, is formed by using the fluorine compound as shown in FIG. 5, and a nozzle 406 in which the portion, which includes the forward end surface 440 of the main nozzle body 432 and which includes the outer or inner wall surface or both of the outer and inner wall surfaces 442, 444 ranging over a distance of not less than 1 mm from the forward end surface 440, is coated with the fluorine compound as shown in FIG. 6.

When the portion, which includes the forward end surface 440 of the main nozzle body 432 and which ranges over the distance of not less than 1 mm from the forward end surface 440, is formed of the fluorine compound, the following arrangement is preferable from a practical viewpoint considering, for example, the strength. That is, for example, the main nozzle body 432 is formed of stainless steel. Further, the forward end surface 440 and the portion ranging over a distance of 5 mm at the maximum from the forward end surface 440 are formed of the fluorine compound.

Figure 15:
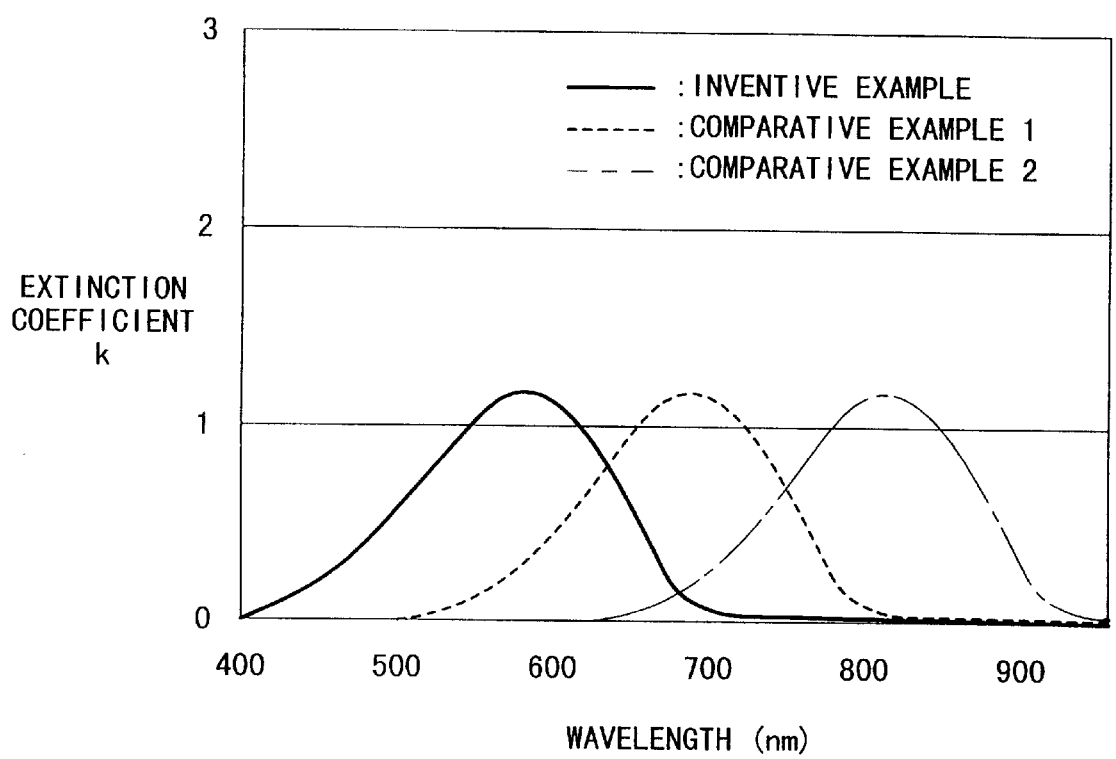
FIG. 15 is a graph showing the relationship between wavelengths of light and extinction coefficients at the time light is passed through a dye.

When the portion, which includes the forward end surface 440 of the main nozzle body 432 and which includes the outer or inner wall surface or both of the outer and inner wall surfaces 442, 444 ranging over the distance of not less than 1 mm from the forward end surface 440, is coated with the fluorine compound as shown in FIG. 15, it is preferable that an area ranging over a distance of not less than 10 mm from the forward end surface 440 of the main nozzle body 432 is coated with the fluorine compound. It is more preferable that the entire area of the main nozzle body 432 is coated with the fluorine compound. When the area as described above is coated, the thickness is not specifically limited. However, the thickness is appropriately within a range of 5 to 500 μm. The material for the main nozzle body 432 is preferably stainless steel as described above. The diameter of the through-hole 430 formed through the main nozzle body 432 is generally within a range of 0.5 to 1.0 mm.

A process of manufacturing an optical disk with the production system 10 will be described below with reference to FIGS. 7A through 8B.

Figure 7A:
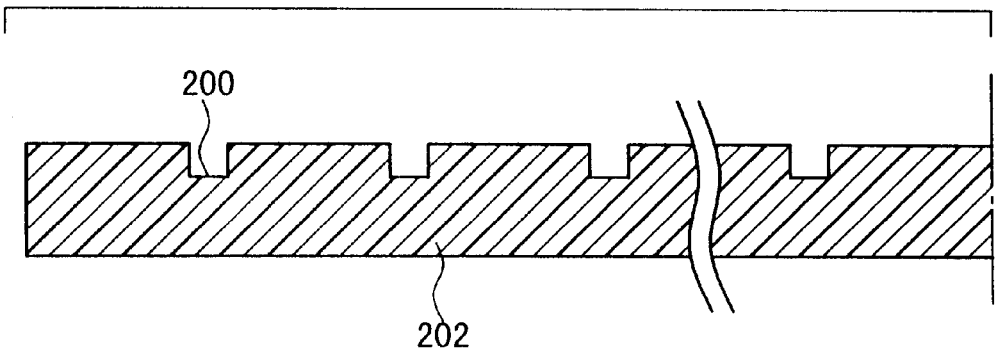
FIG. 7A is a fragmentary cross-sectional view of a substrate with grooves defined therein.

Each of the molding machines 20 of the first and second molding facilities 12A, 12B forms a substrate 202 of synthetic resin such as polycarbonate or the like according to injection molding, compression molding, or injection compression molding. As shown in FIG. 7A, the substrate 202 has grooves (recesses and protrusions) 200 serving as tracking grooves or representing information such as address signals on one principal surface thereof.

The material for the substrate 202 includes, for example, polycarbonate, acrylic resin such as polymethyl methacrylate, vinyl chloride-based resin such as polyvinyl chloride and vinyl chloride copolymer, epoxy resin, amorphous polyolefine, and polyester. These materials may be used in combination, if desired. Among the materials described above, it is preferable to use polycarbonate in view of, for example, the moisture resistance, the dimensional stability, and the price. The depth of the groove 200 is preferably within a range of 0.01 to 0.3 μm. The half value width is preferably within a range of 0.2 to 0.9 μm.

The substrates 202 removed from the molding machines 20 are cooled by the cooling units 22, and then stacked on the stack poles 24 with their principal surfaces facing downwardly. When a predetermined number of substrates 202 are stacked on each of the stack poles 24, the stack poles 24 are removed from the first and second molding facilities 12A, 12B, and fed to the coating facility 14 where the stack poles 24 are placed in the stack pole storage unit 40. The stack poles 24 may be fed by a carriage or a self-propelled feed unit.

Figure 7B:
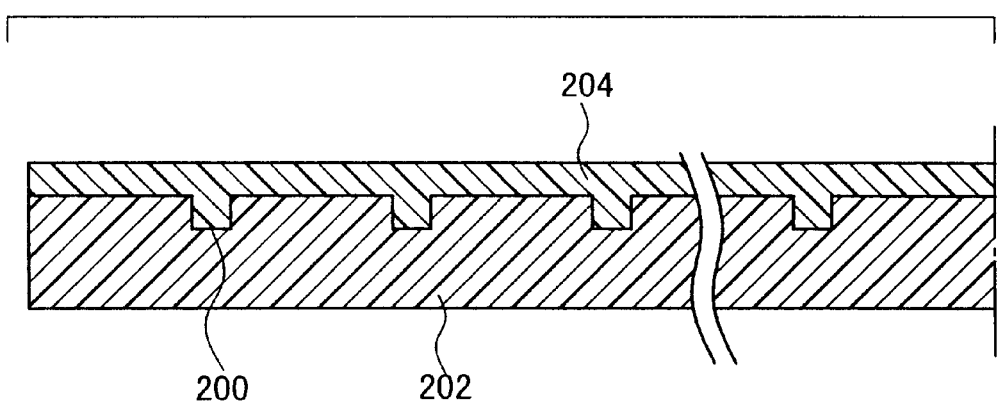
FIG. 7B is a fragmentary cross-sectional view of the substrate with a dye recording layer deposited thereon.

When the stack poles 24 are placed in the stack pole storage unit 40, the first feed mechanism 42 operates to take one at a time of the substrates 202 from the stack poles 24, and feed the substrate 202 to the electrostatic blowing mechanism 44. The electrostatic blowing mechanism 44 removes electrostatic charges from the substrate 202, which is then fed by the second feed mechanism 46 to the dye coating mechanism 48 where the substrate 202 is supplied to either one of the six spin coating devices 52. In the spin coating device 52, the principal surface of the substrate 202 is coated with a dye solution, and then the substrate 202 is rotated at a high speed to uniformize the thickness of the coated dye solution. Thereafter, the coated dye solution is dried into a dye recording layer 204 on the principal surface of the substrate 202, as shown in FIG. 7B.

More specifically, when the substrate 202 is supplied to the spin coating device 52, the substrate 202 is fixedly mounted on the spinner head 402 as shown in FIG. 2 and held horizontally by the fixture 420. The coating solution is supplied from the pressurizing tank to the discharged solution regulating valve 408, which drops a predetermined amount of the coating solution via the nozzle 406 onto a radially inner area of the substrate 202.

As described above, the nozzle 406 has the following surface. That is, the portion, which includes the forward end surface 440 of the main nozzle body 432 and the outer or inner wall surface or both of the outer and inner wall surfaces 442, 444 ranging over the distance of not less than 1 mm from the forward end surface 440, is composed of the fluorine compound. Therefore, the coating solution is less liable to be attached to the nozzle 406, and hence when the coating solution is dried, the dye is prevented from being precipitated and deposited on the nozzle 406. Consequently, the spin coating device 52 can smoothly form a coated film on the substrate 202 without causing problems such as coating defects.

The coating solution comprises a dye solution which comprises a solvent and a dye dissolved therein. The dye in the dye solution has a concentration which generally ranges from 0.01 to 15 weight %, more preferably from 0.1 to 10 weight %, particularly preferably from 0.5 to 5 weight %, or most preferably from 0.5 to 3 weight %.

The spinner head 402 can be rotated at a high speed by the motor. When the spinner head 402 is rotated at a high speed, the coating solution dropped on the substrate 202 flows radially outwardly on the surface of the substrate 202 under centrifugal forces, and reaches the outer circumferential edge of the substrate 202 while forming a coated film on the substrate 202. An excessive amount of the coating solution that flows radially outwardly beyond the outer circumferential edge of the substrate 202 is thrown off the substrate 202 under centrifugal forces and scattered around the outer circumferential edge of the substrate 202. The scattered excessive amount of the coating solution impinges upon the scattering prevention wall 404, is collected by a receptacle disposed below the scattering prevention wall 404, and then recovered through the drain pipe 424. The coated film on the substrate 202 is dried while and after the coating film is formed on the substrate 202. The coated film (the dye recording layer) 204 has a thickness generally in the range from 20 to 500 nm, or preferably in the range from 50 to 300 nm.

The dye to be used for the dye recording layer 204 is not specifically limited. Those usable as the dye include, for example, cyanine dye, phthalocyanine dye, imidazoquinoxaline dye, pyrylium dye, thiopyrylium dye, azulenium dye, squalirium dye, metal complex dye based on, for example, Ni or Cr, naphthoquinone dye, anthraquinone dye, indophenol dye, indoaniline dye, triphenylmethane dye, merocyanine dye, oxonol dye, aminium dye, diimmonium dye, and nitroso compound. Among these dyes, it is preferable to use cyanine dye, phthalocyanine dye, azulenium dye, squalirium dye, oxonol dye, and imidazoquinoxaline dye.

The solvent of the application agent for forming the dye recording layer 204 includes, for example, ester such as butyl acetate and cellosolve acetate; ketone such as methyl ethyl ketone, cyclohexanone, and methyl isobutyl ketone; chlorinated hydrocarbon such as dichloromethane, 1,2-dichloroethane, and chloroform; amide such as dimethylformamide, hydrocarbon such as cyclohexane; ether such as tetrahydrofuran, ethyl ether, and dioxane; alcohol such as ethanol, n-propanol, isopropanol, n-butanol, and diacetone alcohol; fluorine solvent such as 2,2,3,3,-tetrafluoro-1-propanol, and glycol ether such as ethylene glycol monomethyl ether, ethylene glycol monoethyl ether, and propylene glycol monomethyl ether.

The solvent may be used singly or in combination of two or more species in an appropriate manner considering the dissolving property of the dye to be used. Preferably, the fluorine solvent such as 2,2,3,3,-tetrafluoro-1-propanol is used. An anti-fading agent and a binder may be added to the dye solution, if desired. Further, a variety of additives such as an antioxidant, a UV-absorbing agent, a plasticizer, and a lubricant may be added to the dye solution depending on the purpose of the use.

Representative examples of the anti-fading agent include nitroso compound, metal complex, diimmonium salt, and aminium salt. These examples are described, for example, in respective patent documents such as Japanese Laid-Open Patent Publication Nos. 2-300288, 3-224793, and 4-146189.

The binder includes, for example, natural organic high-molecular compound such as gelatin, cellulose derivative, dextran, rosin, and rubber; and synthetic organic high-molecular compound including, for example, hydrocarbon resin such as polyethylene, polypropylene, polystyrene, and polyisobutylene, vinyl resin such as polyvinyl chloride, polyvinyl vinylidene, and polyvinyl chloride-polyvinyl acetate copolymer, acrylic resin such as polymethyl acrylate and polymethyl methacrylate, polyvinyl alcohol, chlorinated polyethylene, epoxy resin, butylal resin, rubber derivative, and initial condensate of thermosetting resin such as phenol-formaldehyde resin.

If a binder is used, then it should be of at most 20 weight parts, preferably at most 10 weight parts, and more preferably at most 5 weight parts with respect to 100 weight parts of the dye.

An undercoat layer may be deposited on the surface of the substrate 202 on which the dye recording layer 204 is disposed, for the purposes of improving the planarity, increasing the bonding strength, and preventing the dye recording layer 204 from being modified.

The material for the undercoat layer includes, for example, high-molecular compound such as polymethyl methacrylate, acrylic acid-methacrylic acid copolymer, styrene-maleic anhydride copolymer, polyvinyl alcohol, N-methylol acrylamide, styrene-vinyltoluene copolymer, chlorosulfonated polyethylene, nitrocellulose, polyvinyl chloride, chlorinated polyolefine, polyester, polyimide, vinyl acetate-vinyl chloride copolymer, ethylene-vinyl acetate copolymer, polyethylene, polypropylene, and polycarbonate; and surface modifier such as silane coupling agent.

The undercoat layer can be formed by dissolving or dispersing one of the above materials into a suitable solvent to prepare an undercoat layer solution, and then coating the undercoat layer solution on the substrate surface according to a coating process such as a spin coating process, a dip coating process, an extrusion coating process, or the like. The undercoat layer is applied to a thickness which generally ranges from 0.005 to 20 $\mu$m, and preferably ranges from 0.01 to 10 $\mu$m.

The substrate 202 with the dye recording layer 204 formed thereon is fed by the third feed mechanism 50 to the reverse cleaning mechanism 54, which cleans the reverse surface of the substrate 202 which is opposite to the principal surface thereof. Thereafter, the substrate 202 is delivered by the fourth feed mechanism 56 to the number assigning mechanism 58, which assigns a number such as a lot number to the principal or reverse surface of the substrate 202.

Thereafter, the substrate 202 is fed to the film thickness inspecting mechanism 62 for inspecting the film thickness of the dye recording layer 204 on the substrate 202. Specifically, the film thickness inspecting mechanism 62 applies light to the reverse side of the substrate 202 and processes an image of light transmitted through the substrate 202 and the dye recording layer 204 with a CCD camera. Based on the inspected result from the film thickness inspecting mechanism 62, the inspected substrate 202 is delivered to the stack pole 64 for normal substrates or the stack pole 66 for defective substrates. The inspecting operation of the film thickness inspecting mechanism 62 will be described later on.

When a predetermined number of substrates 202 are stacked on the stack pole 64 for normal substrates, the stack pole 64 for normal substrates is removed from the coating facility 14, and fed to the post-treatment facility 16 where it is stored in the stack pole storage unit 80. The stack pole 64 may be fed by a carriage or a self-propelled feed unit.

When the stack pole 64 for normal substrates is stored in the stack pole storage unit 80, the fifth feed mechanism 82 operates to remove one at a time of the substrates 202 from the stack pole 64 and feed the substrate 202 to the first electrostatic blowing mechanism 84. The first electrostatic blowing mechanism 84 removes electrostatic charges from the substrate 202, which is then delivered by the sixth feed mechanism 86 to the sputtering mechanism 88.

Figure 7C:
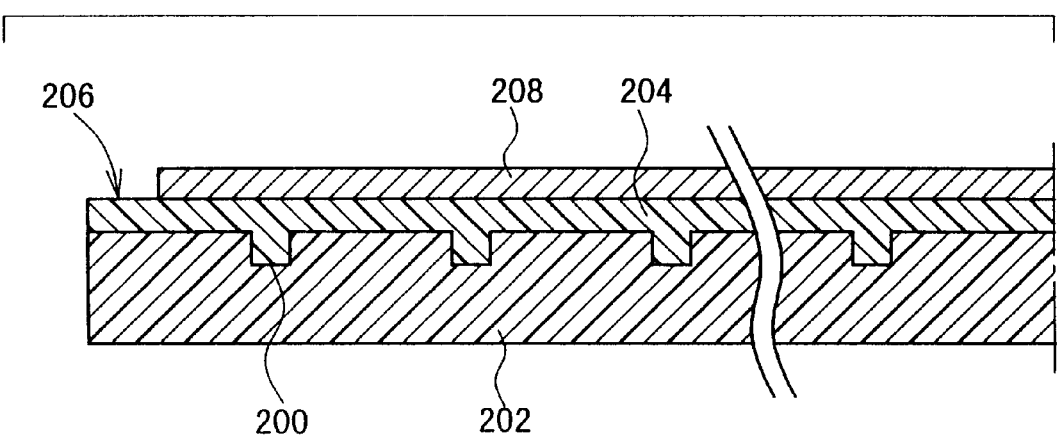
FIG. 7C is a fragmentary cross-sectional view of the substrate with a light reflecting layer disposed on the dye recording layer.

When the substrate 202 is supplied to the sputtering mechanism 88, as shown in FIG. 7C, a light reflecting layer 208 is formed, by sputtering, on the entire principal surface of the substrate 202 except for a peripheral edge 206 thereof.

The light reflecting layer 208 is made of a light reflecting material which has a high reflectance with respect to a laser beam. For example, the light reflecting material may be a metal or a semimetal such as Mg, Se, Y, Ti, Zr, Hf, V, Nb, Ta, Cr, Mo, W, Mn, Re, Fe, Co, Ni, Ru, Rh, Pd, Ir, Pt, Cu, Ag, Au, Zn, Cd, Al, Ga, In, Si, Ge, Te, Pb, Po, Sn, Bi, or the like, or stainless steel.

Of these materials, Cr, Ni, Pt, Cu, Ag, Au, Al, and stainless steel are preferable. These materials may be used alone or in a combination of or as an alloy of at least two materials. Particularly preferable is Au, Ag or an alloy thereof.

The light reflecting layer 208 can be formed on the dye recording layer 204 by evaporating, sputtering, or ion-plating the light reflecting material. The light reflecting layer 208 has a thickness generally in the range from 10 to 800 nm, preferably in the range from 20 to 500 nm, or more preferably in the range from 50 to 300 nm.

Figure 8A:
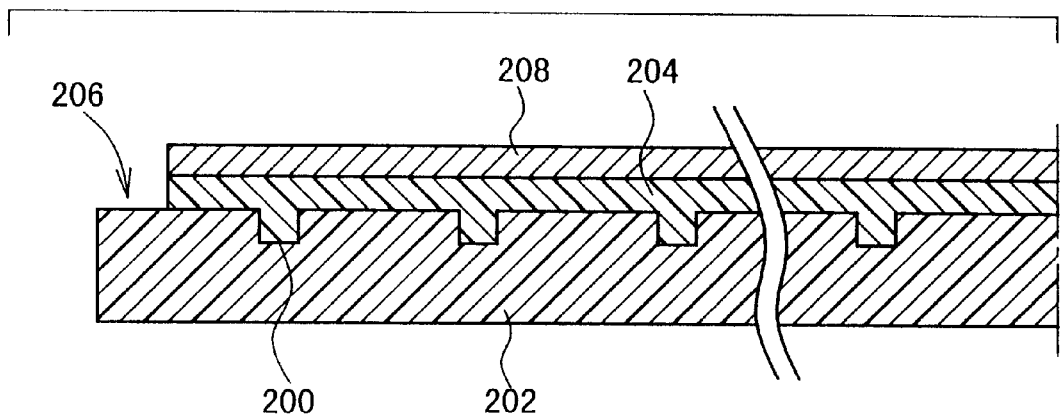
FIG. 8A is a fragmentary cross-sectional view of the substrate with its edge cleaned.

The substrate 202 on which the light reflecting layer 208 is formed is fed by the seventh feed mechanism 90 to the edge cleaning mechanism 92, which, as shown in FIG. 8A, cleans the edge 206 of the principal surface of the substrate 202 to remove the dye recording layer 204 from the edge 206. Thereafter, the substrate 202 is delivered by the eighth feed mechanism 102 to the second electrostatic blowing mechanism 94, which removes electrostatic charges from the substrate 202.

Thereafter, the substrate 202 is fed by the eighth feed mechanism 102 to the UV-curable solution coating mechanism 96, which drops an UV-curable solution onto a portion of the principal surface of the substrate 202. Then, the substrate 202 is fed by the eighth feed mechanism 102 to the spinning mechanism 98, which rotates the substrate 202 at a high speed to spread the dropped UV-curable solution to a uniform film thickness over the entire principal surface of the substrate 202.

Figure 8B:
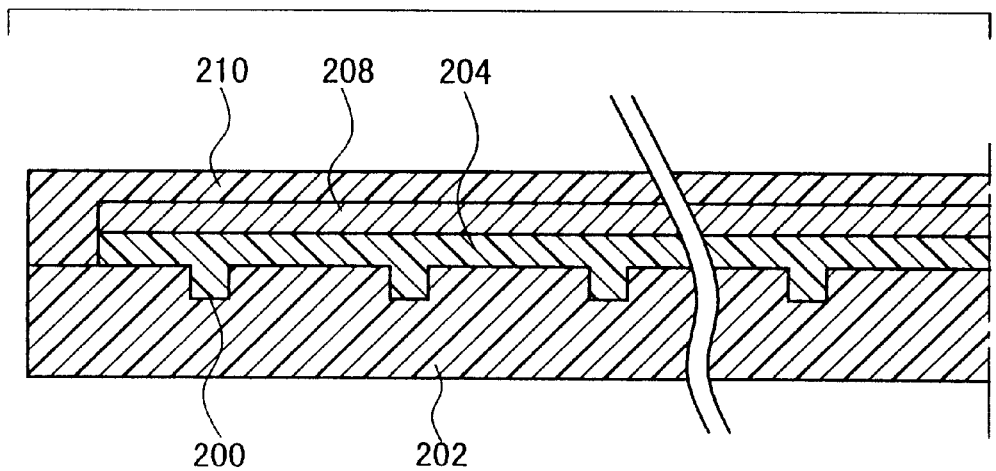
FIG. 8B is a fragmentary cross-sectional view of the substrate with a protective layer disposed thereon.

Thereafter, the substrate 202 is fed by the eighth feed mechanism 102 to the UV applying mechanism 100, which applies ultraviolet rays to the UV-curable solution on the substrate 202. As shown in FIG. 8B, the UV-curable solution is cured into a protective layer 210 covering the dye recording layer 204 and the light reflecting layer 208, thus completing an optical disk D.

The protective layer 210 is disposed on the light reflecting layer 208 for physically and chemically protecting the dye recording layer 204. The protective layer 210 may also be formed on the surface of the substrate 202 opposite to the dye recording layer 204 for the purpose of increasing the scratch resistance and the moisture resistance of the optical disk D. The protective layer 210 may be made of an inorganic substance such as SiO, $SiO_2$, $MgF_2$, $SnO_2$, $Si_3N_4$, or the like, or an organic substance such as a thermoplastic resin, a thermosetting resin, an UV-curable resin, or the like.

The protective layer 210 may alternatively be formed by laminating a film produced by extruding plastics on the light reflecting layer 208 and/or the substrate 202 with an adhesive. Further alternatively, the protective layer 210 may be formed by a process such as vacuum evaporation, sputtering, coating, or the like. If the protective layer 210 is made of a thermoplastic resin or a thermosetting resin, then it is formed by dissolving one of these materials into a suitable solvent to prepare a protective layer solution, and then coating the protective layer solution on the substrate surface and drying the coated protective layer solution.

If the protective layer 210 is made of a UV-curable resin, then it is formed by coating the UV-curable resin directly on the substrate surface or dissolving one UV-curable resin into a suitable solvent to prepare a protective layer solution, and coating the protective layer solution on the substrate surface, and then applying ultraviolet rays to cure the coated UV-curable resin. Various additives including a charge inhibitor, an oxidation inhibitor, an UV absorbent, etc. may be added to the protective layer solution.

The protective layer 210 has a thickness generally in the range from 0.1 to 100 $\mu$m.

Subsequently, the optical disk D is fed by the ninth feed mechanism 104 to the defect inspecting mechanism 106 and the characteristic inspecting mechanism 108, which inspect the dye recording layer 204 and the protective layer 210 for defects on their surfaces and also inspect signal characteristics due to the grooves 200 formed in the substrate 202 of the optical disk D. Specifically, each of the defect inspecting mechanism 106 and the characteristic inspecting mechanism 108 applies light to both surfaces of the optical disk D and processes an image of light reflected thereby with a CCD camera. The inspected results obtained by the defect inspecting mechanism 106 and the characteristic inspecting mechanism 108 are transmitted to the sorting mechanism 114.

The optical disk D after it has been inspected for defects and signal characteristics is sorted by the sorting mechanism 114 selectively to the stack pole 110 for normal disks and the stack pole 112 for defective disks depending on the inspected results.

Figure 9B:
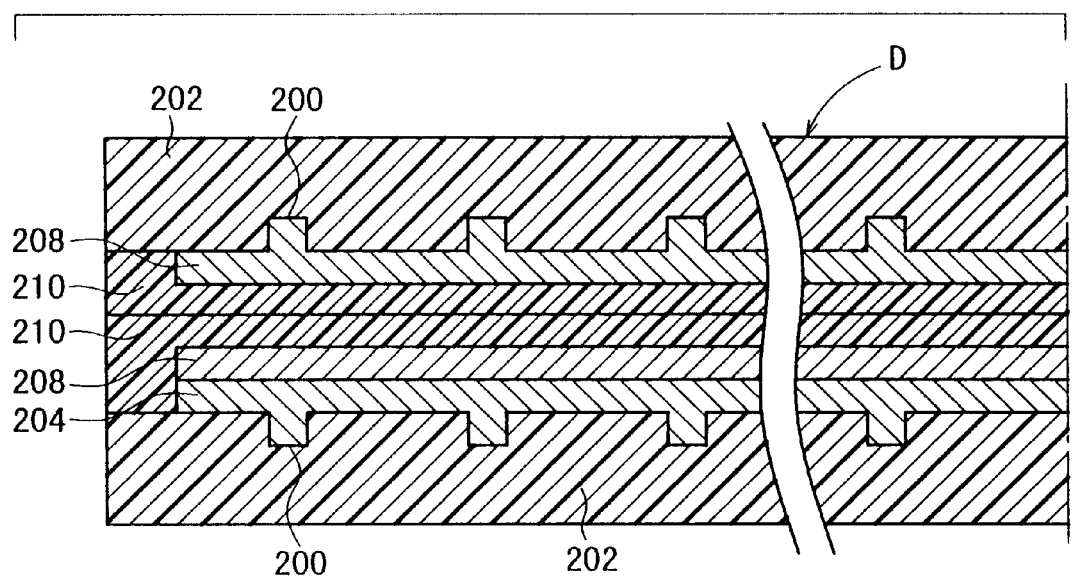
FIG. 9B is a fragmentary cross-sectional view of an optical disk.

The substrate 202 delivered to the stack pole 110 for normal disks is fed to the bonding mechanism 118 by the tenth feed mechanism 116. The bonding mechanism 118 bonds the substrate 202 delivered by the tenth feed mechanism 116 and the substrate 202 (see FIG. 9A) stocked in the bonding mechanism 118 and having the light reflecting layer 208 and the protective layer 210, to each other such that their information recording surfaces face each other, thus completing an optical disk D (see FIG. 9B). The optical disk D is then delivered to a non-illustrated label printing process.

Figure 10:
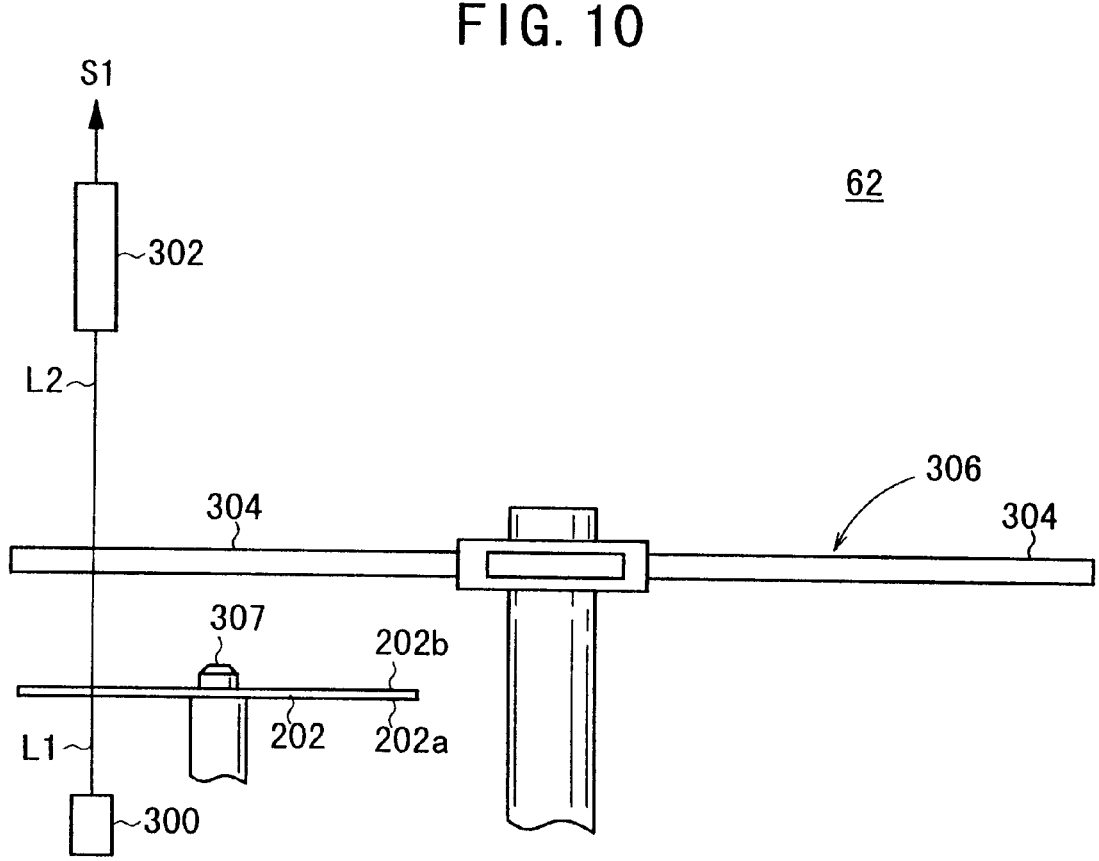
FIG. 10 is a side elevational view of a thickness inspecting mechanism of the production system.

The film thickness inspecting mechanism 62 will be described below with reference to FIGS. 10 and 11. As shown in FIG. 10, the film thickness inspecting mechanism 62 comprises a light source 300 disposed below a substrate 202, a CCD unit 302 for detecting a light beam L2 emitted from the light source 300 and transmitted through the substrate 202 and converting the detected light beam L2 into an electric signal (detected signal) S1 commensurate with the detected intensity of the light beam L2, a substrate feeder 306 having a plurality of light shield plates 304 for blocking a light beam L1 emitted from the light source 300, and a substrate holder 307 for holding the substrate 202.

Figure 11:
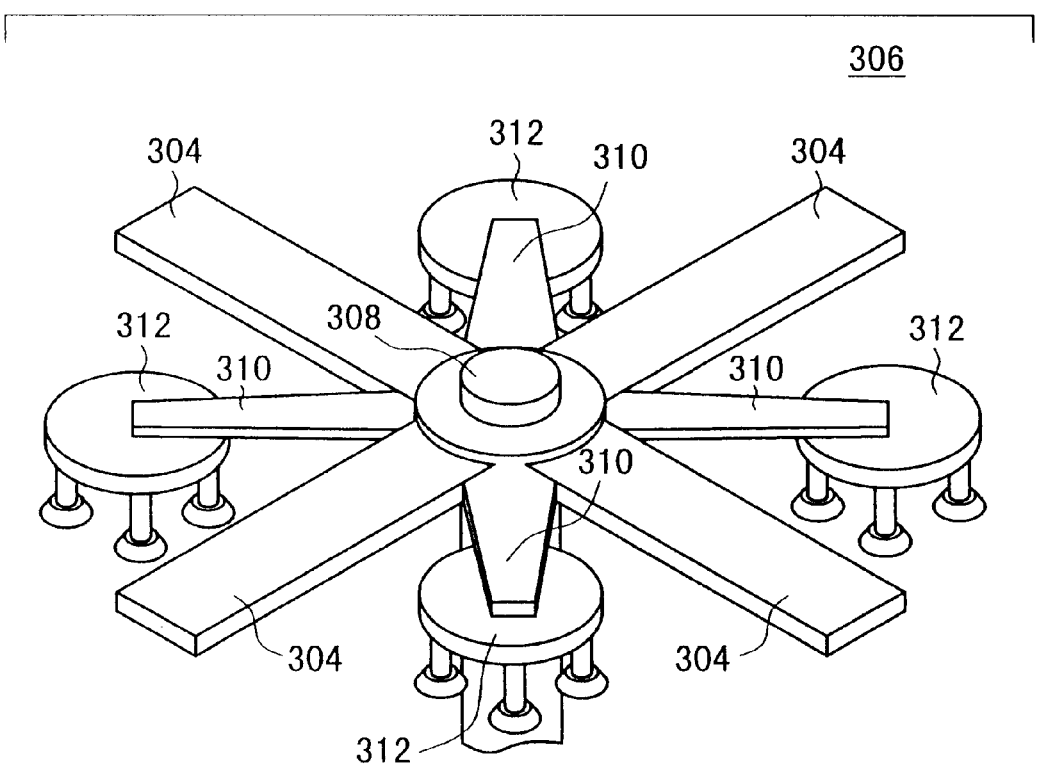
FIG. 11 is a perspective view of a substrate feeding device of the thickness inspecting mechanism.

As shown in FIG. 11, the substrate feeder 306 has a central rotary shaft 308 from which the light shield plates 304 extend radially outwardly at angular intervals of 90°, and a plurality of arms 310 extending from the central rotary shaft 308 between the light shield plates 304. Suction pads 312 for attracting and holding substrates 202 are mounted on respective radially outer ends of the arms 310.

When the central rotary shaft 308 rotates about its own axis, the substrates 202 held by the suction pads 312 are successively delivered from the number assigning mechanism 58 to the substrate holder 307 and from the substrate holder 307 to the stack pole 64 for normal substrates or the stack pole 66 for defective substrates.

Figure 12:
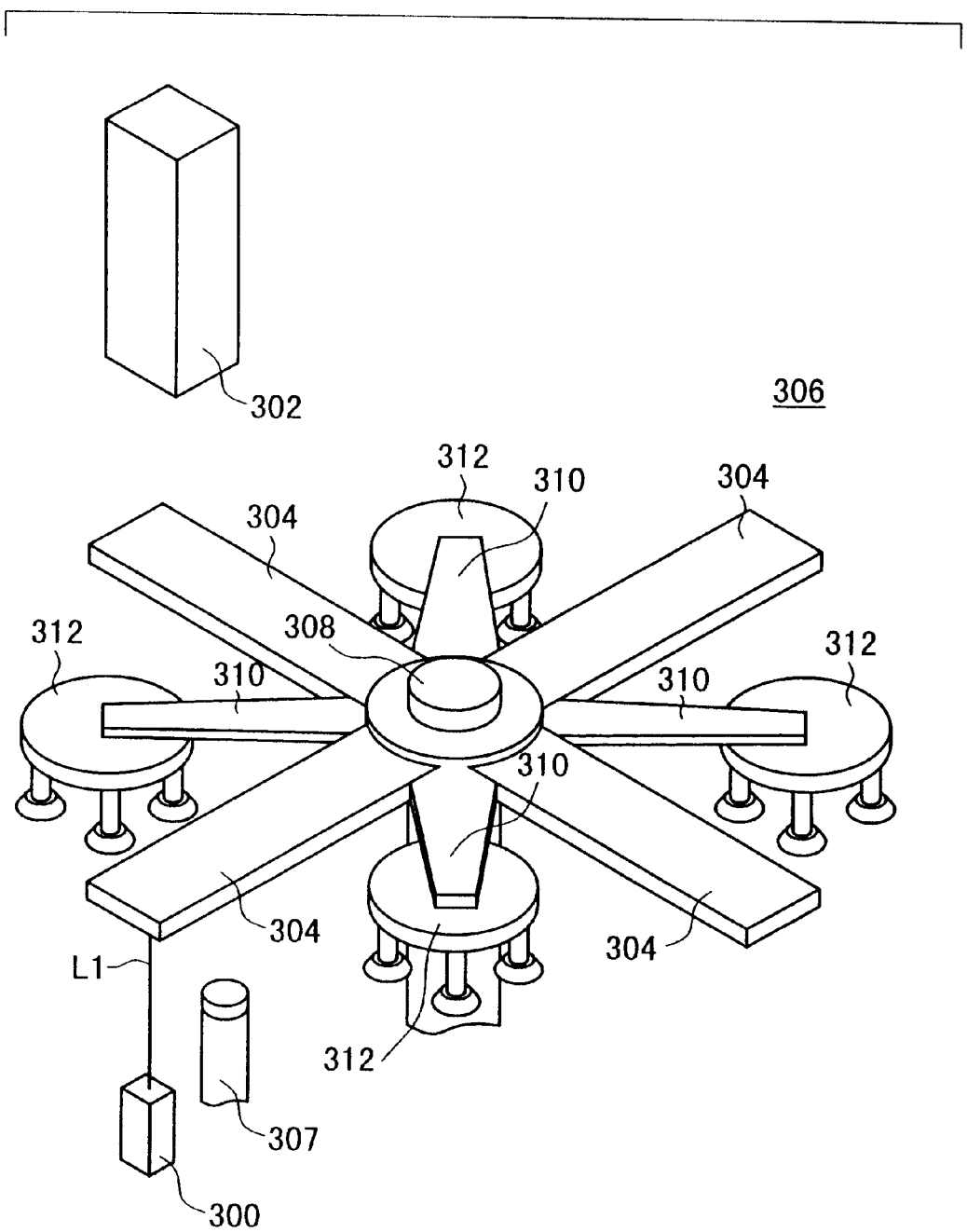
FIG. 12 is a perspective view of the substrate feeding device with a light shield plate positioned over a light source.

Processing operation of the film thickness inspecting mechanism 62 will be described below. Before a substrate 202 is delivered to the substrate holder 307 by the substrate feeder 306, the light beam L1 emitted from the light source 300 is blocked in its entirety by one of the light shield plates 304, and an amount of light other than the light beam from the light source 300, i.e., an amount of ambient light such as light emitted by fluorescent lamps, is detected by the CCD unit 302 (see FIG. 12).

Figure 13:
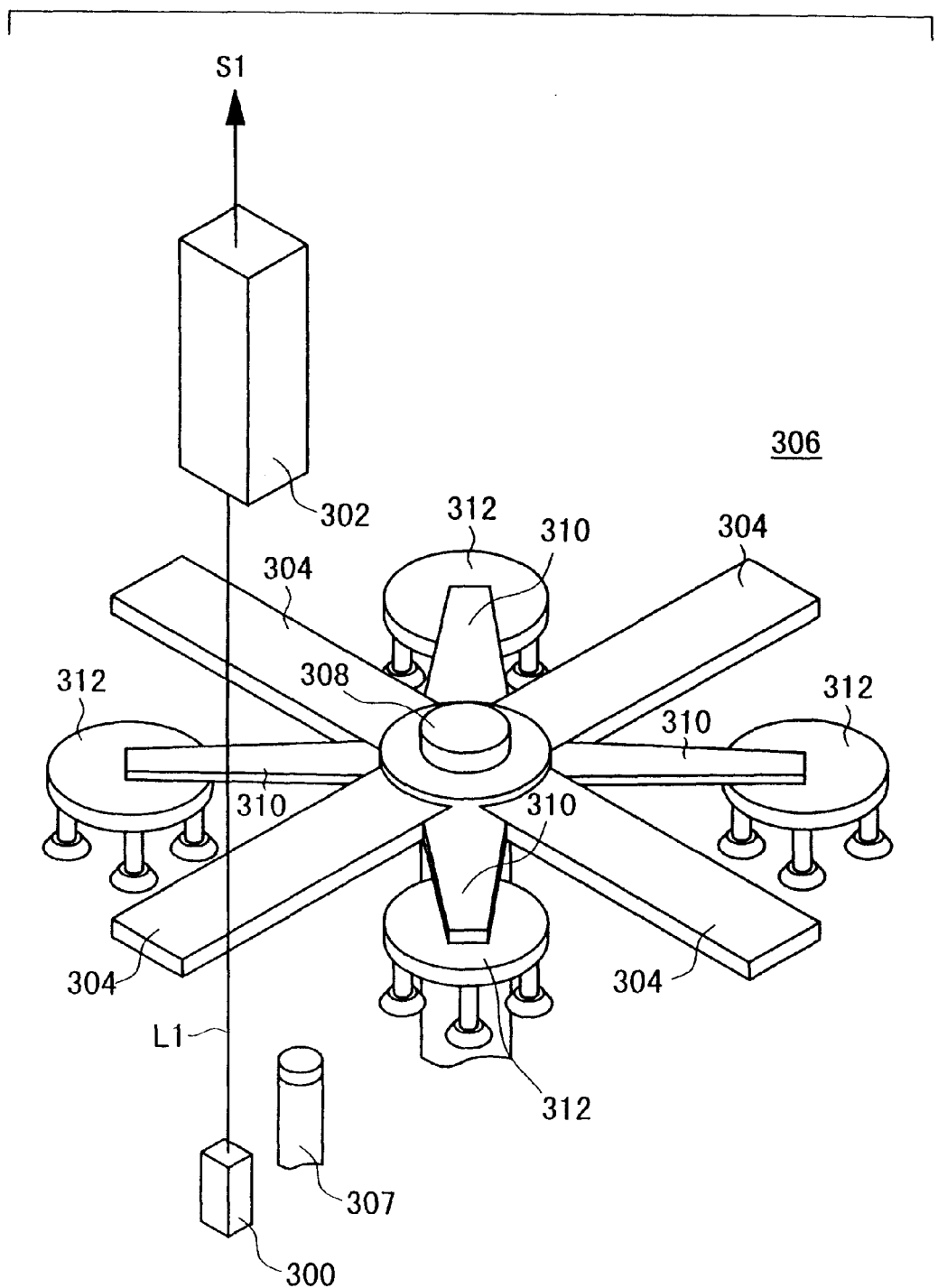
FIG. 13 is a perspective view of the substrate feeding device with no light shield positioned over a light source.

Thereafter, the central rotary shaft 308 rotates about its own axis to remove any light shields from above the light source 300 (see FIG. 13). The full amount of the light beam L1 emitted from the light source 300, including the amount of available ambient light, is detected by the CCD unit 302.

Further rotation of the central rotary shaft 308 places the substrate 202 on the substrate holder 307, and the light beam L1 emitted from the light source 300 is applied via a substrate surface 202a to a dye recording surface 202b (see FIG. 10).

At this stage of the fabrication process, the light reflecting layer 208 (see FIG. 8A) is not formed on the dye recording layer 204 (see FIG. 7B). Therefore, the light beam L1 emitted from the light source 300 passes through the substrate 202 and falls on the CCD unit 302. The CCD unit 302 then generates a detected signal S1 having a voltage level depending on the amount of the transmitted light beam L2.

After the film thickness of the dye recording layer 204 on the substrate 202 is inspected, the substrate 202 is delivered to the stack pole 64 for normal substrates or the stack pole 66 for defective substrates depending on the inspected result. At the same time that the substrate 202 is delivered to the stack pole 64 for normal substrates or the stack pole 66 for defective substrates, the above processing operation is repeated at given intervals.

In the above first embodiment, the amount of light other than the light beam L1 emitted from the light source 300 and the amount of the light beam L1 emitted from the light source 300 are alternately detected at certain intervals. Therefore, even if the detected amount of the light beam L2 transmitted through the substrate 202 is affected by ambient light such as light from fluorescent lamps, the detected amount of the light beam L2 can be compensated for the ambient light after the detected signal is received. Therefore, only the amount of the light beam L2 transmitted through the substrate 202 can be detected. As a result, the film thickness of the dye recording layer 204 can be inspected with increased accuracy.

The light beam L1, which is emitted as a flickering light beam from the light source 300, will be described below.

Generally, one of elements which represent an optical property of an absorbent medium (conductivity σ≠0) such as a dye is a complex index of refraction. The complex index of refraction is expressed according to the following equation (1):

$$\text{Complex index of refraction} = n \mp ik \tag{1}$$

where n represents a refractive index and k represents an extinction coefficient. The extinction coefficient k indicates how light is attenuated as it is propagated through a medium. The refractive index n and the extinction coefficient k are collectively referred to as an optical constant.

When light is propagated through a medium such as a dye, the optical constant changes depending on the wavelength of the light. For example, FIG. 15 is a graph showing the relationship between wavelengths of light and extinction coefficients k at the time light is passed through a dye. In FIG. 15, the solid-line curve represents the dye used in the optical disk in an inventive example according to the first embodiment, the dotted-line curve represents a dye according to a first comparative example, and the dot-and-dash-line curve represents a dye according to a second comparative example. It can be seen from FIG. 15 that the relationship between wavelengths of light and extinction coefficients k in each of those dyes is of an upwardly convex shape.

In order to inspect to the film thickness of a dye film formed on a substrate, it has been customary to pass light through the dye film and measure the transmittance of the light for thereby inspecting the film thickness. Specifically, the optical density of the transmitted light is determined from the measured transmittance, and the film thickness of the dye film is inspected based on the optical density of the transmitted light. The optical density of the transmitted light is determined according to the following equation (2):

$$\text{Optical density of transmitted light} = -\log_{10}(\text{transmittance}) \tag{2}$$

However, depending on the wavelength of the transmitted light, the film thickness of the dye film may not uniquely be measured because of the effect of the optical constant of the dye contained in the dye film, particularly the extinction coefficient k.

Figure 16:
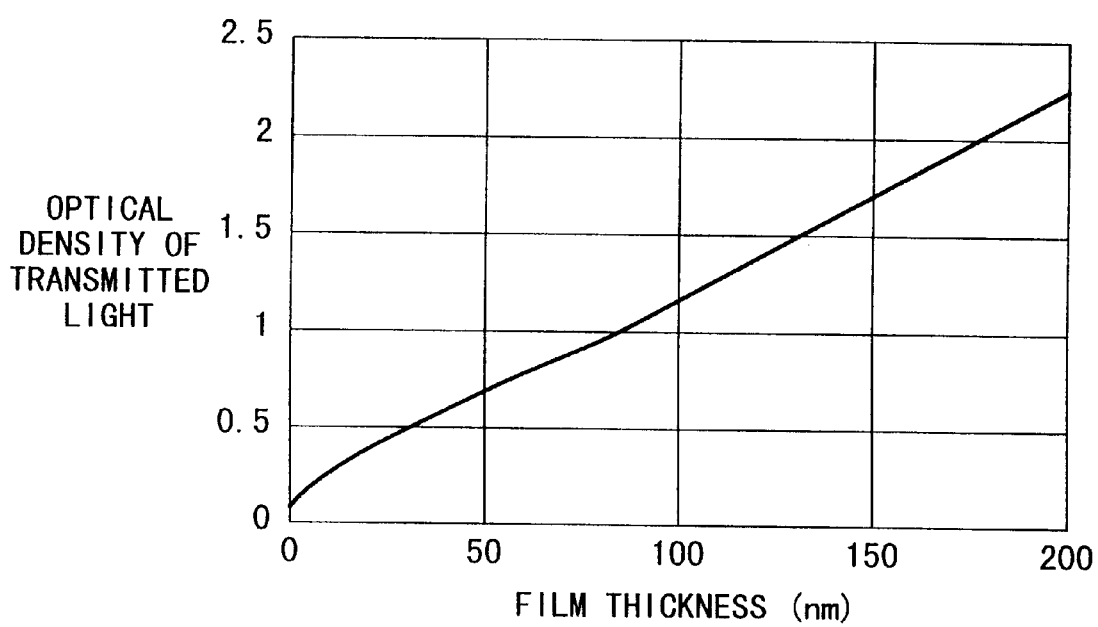
FIG. 16 is a graph showing the relationship between the thicknesses of dye recording layers and the optical densities of transmitted light at the time light having a wavelength of 570 nm is passed through the dye recording layers.
Figure 17:
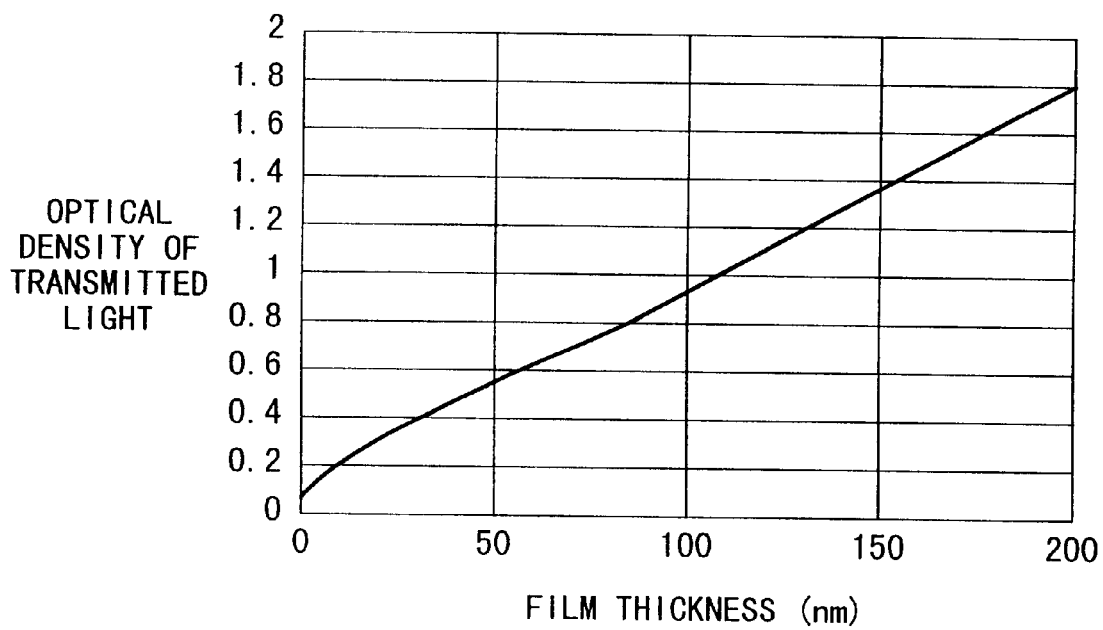
FIG. 17 is a graph showing the relationship between the thicknesses of dye recording layers and the optical densities of transmitted light at the time light having a wavelength of 590 nm is passed through the dye recording layers.
Figure 18:
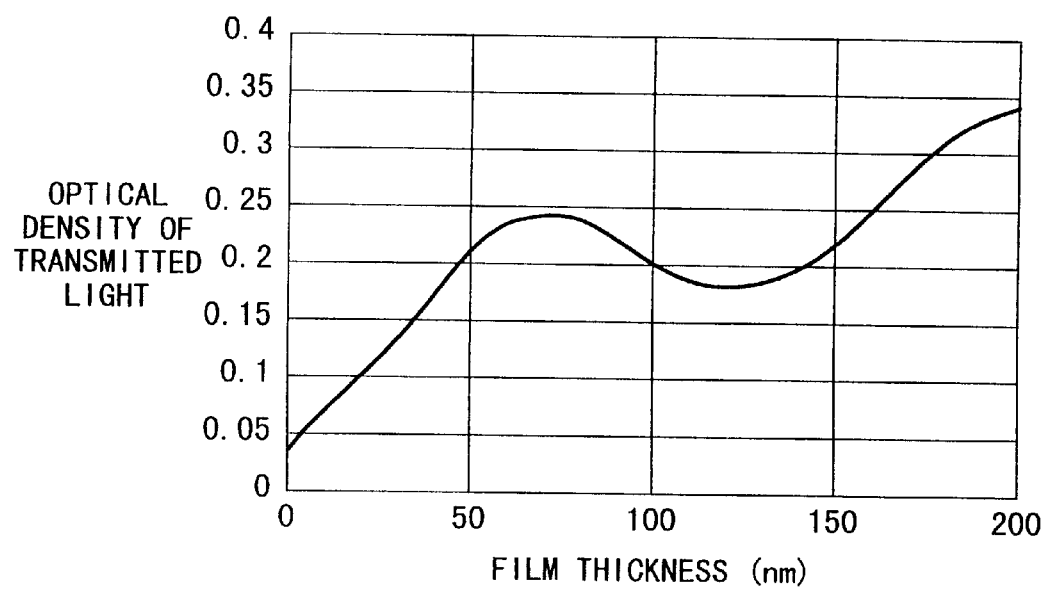
FIG. 18 is a graph showing the relationship between the thicknesses of dye recording layers and the optical densities of transmitted light at the time light having a wavelength of 630 nm is passed through the dye recording layers.
Figure 19:
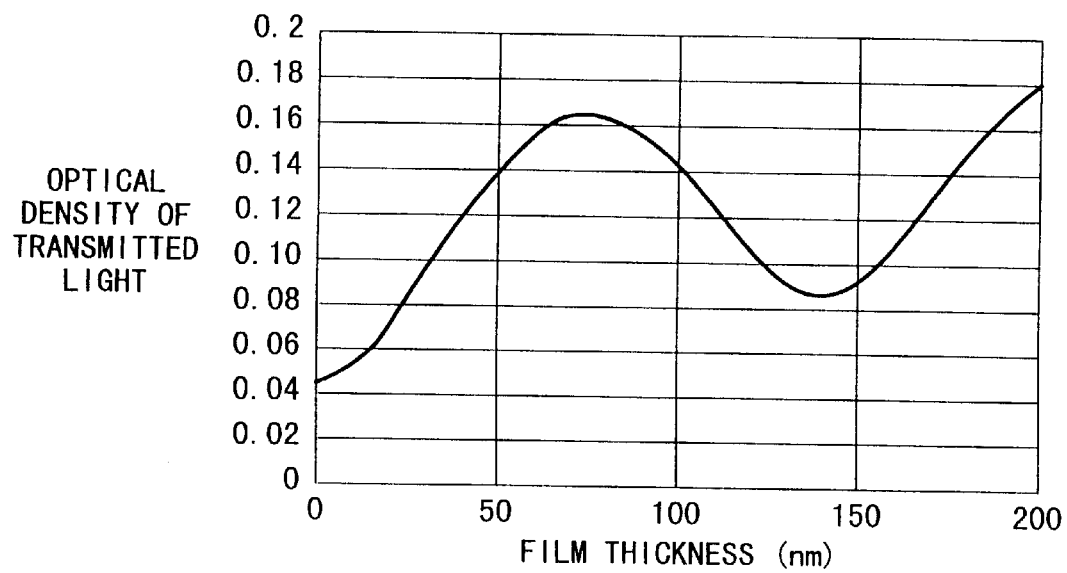
FIG. 19 is a graph showing the relationship between the thicknesses of dye recording layers and the optical densities of transmitted light at the time light having a wavelength of 650 nm is passed through the dye recording layers.

FIGS. 16 through 19 show the relationship between optical densities of transmitted light and film thicknesses at the time light having certain wavelengths is passed through the dye recording layer 204 according to the first embodiment. FIG. 16 shows the relationship between optical densities of transmitted light and film thicknesses at the time light having a wavelength of 570 nm is passed through the dye recording layer 204. FIG. 17 shows the relationship between optical densities of transmitted light and film thicknesses at the time light having a wavelength of 590 nm is passed through the dye recording layer 204. FIG. 18 shows the relationship between optical densities of transmitted light and film thicknesses at the time light having a wavelength of 630 nm is passed through the dye recording layer 204. FIG. 19 shows the relationship between optical densities of transmitted light and film thicknesses at the time light having a wavelength of 650 nm is passed through the dye recording layer 204.

As can be understood from FIGS. 16 through 19, when the transmitted light has wavelengths of 570 nm and 590 nm, the relationship between optical densities of transmitted light and film thicknesses is approximately represented by a linear function. When the transmitted light has a wavelength of 630 nm, if the optical density of the transmitted light has a value of 0.2, then the film thickness has three values. Similarly, when the transmitted light has a wavelength of 650 nm, if the optical density of the transmitted light has a value of 0.12, then the film thickness has three values.

For measuring the film thickness of the dye recording layer 204 based on the optical density of the transmitted light, it is necessary to select such light that the relationship between optical densities of transmitted light and film thicknesses is approximately represented by a linear function. If light having a wavelength ranging from 450 to 610 nm (indicated by the upwardly convex solid-line curve in FIG. 15) is transmitted through the dye recording layer 204, then the relationship between optical densities of transmitted light and film thicknesses is approximately represented by a linear function, allowing the film thickness to be measured substantially accurately.

However, as can be seen from FIG. 15, if the range of wavelengths (upwardly convex graphs) in which the relationship between optical densities of transmitted light and film thicknesses can be approximately represented by a linear function is shifted depending on the dye, and if light to be transmitted is selected based on only the wavelength thereof, then since the relationship between optical densities of transmitted light and film thicknesses cannot be approximately represented by a linear function, the film thickness of the dye recording layer may not be measured.

Therefore, when various types of dyes are employed, it is necessary to employ such light that the relationship between optical densities of transmitted light and film thicknesses is approximately represented by a linear function. A review of FIG. 15 indicates that if light is selected based on the extinction coefficient k, then the relationship between optical densities of transmitted light and film thicknesses is approximately represented by a linear function irrespectively of the type of the dye employed, thus allowing the film thickness to be measured substantially accurately.

The extinction coefficient k at the complex index of refraction for the light beam L1 should preferably range from 0.2 to 1.2, more preferably range from 0.5 to 1.2, and most preferably range from 0.9 to 1.2.

If a lock-in amplifier is used to detect the light beam L2 that has passed through the substrate 202, the amount of the light beam L2 can be detected highly accurately.

A production system 10 according to a second embodiment of the present invention will be described below with reference to FIG. 14. Those parts of the production system 10 according to the second embodiment which are identical to those of the production system 10 according to the first embodiment are denoted by identical reference characters, and will not be described in detail below.

The production system 10 according to the second embodiment is of an arrangement that is essentially identical to the production system 10 according to the first embodiment, but differs therefrom with respect to a portion of the film thickness inspecting mechanism 62.

Figure 14:
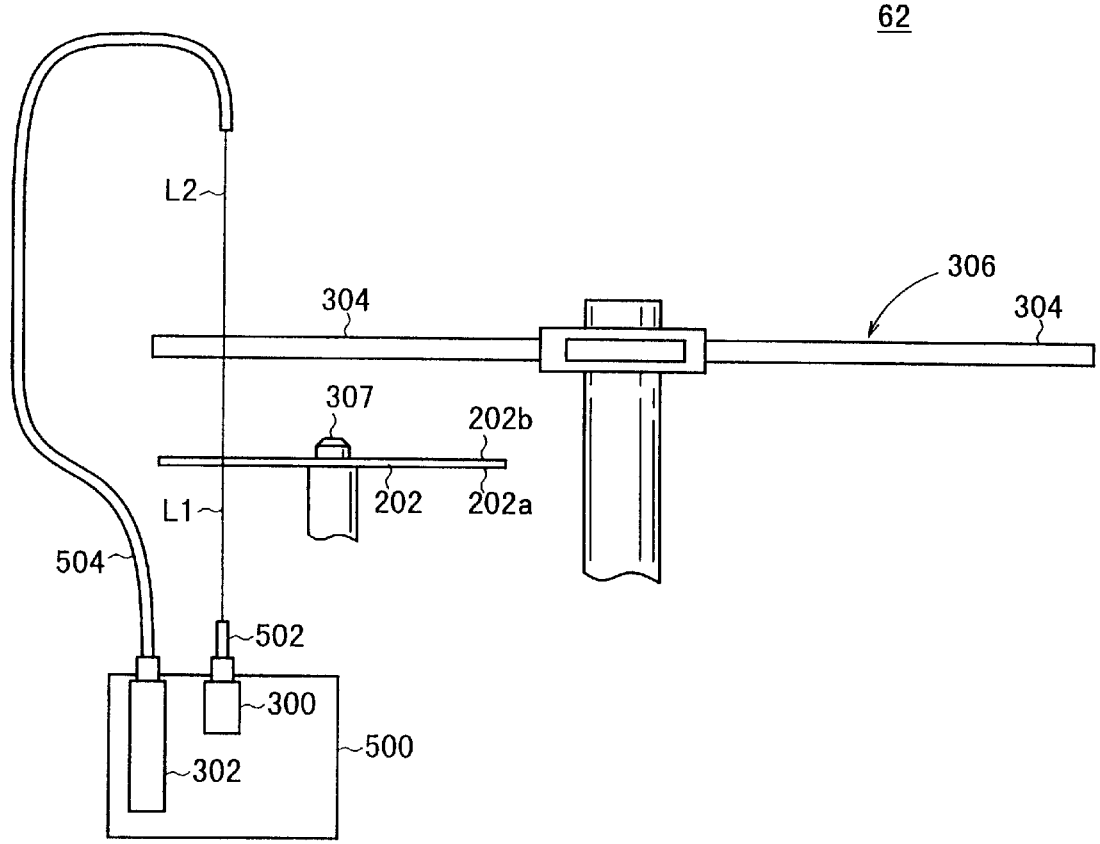
FIG. 14 is a side elevational view of a thickness inspecting mechanism in a production system according to a second embodiment of the present invention.

As shown in FIG. 14, the film thickness inspecting mechanism 62 in the production system 10 according to the second embodiment comprises a light source 300 and a CCD unit 302 which are fabricated as a monolithic structure on a semiconductor substrate 500. A light beam L1 emitted from the light source 300 passes through an optical fiber 502 and is applied via a substrate surface 202a of the substrate 202 to a dye recording surface 202b. Thereafter, a light beam L2 transmitted through the substrate 202 travels through an optical fiber 504 and is detected by the CCD unit 302, which produces an electric signal (detected signal) S1 representing the amount of the detected light beam.

Since the light source 300 and the CCD unit 302 are subject to the same temperature, there is developed no temperature difference between the light source 300 and the CCD unit 302. As a result, the film thickness of the dye recording layer 204 can be inspected with high accuracy. Since the light source 300 and the CCD unit 302 are not affected by ambient light, the accuracy with which to inspect the film thickness of the dye recording layer 204 is greatly increased.

Although certain preferred embodiments of the present invention have been shown and described in detail, it should be understood that various changes and modifications may be made therein without departing from the scope of the appended claims.

What is claimed is:

1. An optical information recording medium of the heat-mode type, comprising:

a substrate; and a recording layer disposed on said substrate for recording information upon exposure to a laser beam;

said optical information recording medium being fabricated by inspecting a film thickness of said recording layer based on a detected signal from transmitted light detecting means for detecting a light beam having passed through said substrate, and inspecting a full amount of a light beam emitted from light applying means for applying the light beam to said substrate with said recording layer disposed thereon and an amount of light while the light beam emitted from said light applying means is being blocked by light shielding means for blocking the light beam emitted from said light applying means.

2. A method of manufacturing an optical information recording medium of the heat-mode type having a substrate, and a recording layer disposed on said substrate for recording information upon exposure to a laser beam, using film thickness inspecting means for inspecting a film thickness of said recording layer, said film thickness inspecting means having light applying means for applying the light beam to said substrate with said recording layer disposed thereon, transmitted light detecting means for detecting a light beam having passed through said substrate, and light shielding means for blocking the light beam emitted from said light applying means, said method comprising the steps of:

inspecting a film thickness of said recording layer based on a detected signal from said transmitted light detecting means; and inspecting a full amount of the light beam emitted from said light applying means and an amount of light while the light beam emitted from said light applying means is being blocked by said light shielding means.

3. A method according to claim 2, wherein said light beam emitted from said light applying means has an extinction coefficient ranging from 0.2 to 1.2 at a complex index of refraction.

4. A method of manufacturing an optical information recording medium of the heat-mode type having a substrate, and a recording layer disposed on said substrate for recording information upon exposure to a laser beam, using film thickness inspecting means for inspecting a film thickness of said recording layer, said film thickness inspecting means having light applying means for applying the light beam to said substrate with said recording layer disposed thereon, and transmitted light detecting means for detecting a light beam having passed through said substrate, said method comprising the steps of:

inspecting a film thickness of said recording layer based on a detected signal from said transmitted light detecting means; and setting an extinction coefficient of said light beam emitted from said light applying means to a value ranging from 0.2 to 1.2 at a complex index of refraction.

5. A method according to claim 3, wherein said light beam emitted from said light applying means comprises a flickering light beam.

6. A method according to claim 5, wherein said light applying means and said transmitted light detecting means are fabricated as a monolithic structure on a substrate.

7. A method according to claim 6, wherein said substrate is made of a semiconductor.

8. A method according to claim 7, wherein said film thickness inspecting means includes an optical fiber for guiding said light beam emitted from said light applying means to said substrate and an optical fiber for guiding said light beam having passed through said substrate to said transmitted light detecting means.

* * * * *